US012767787B2

(12) United States Patent
Kato et al.

(10) Patent No.: US 12,767,787 B2
(45) Date of Patent: Oct. 20, 2026

(54) RESIN COMPOSITION, BINDER FOR BATTERY, ELECTRODE MIXTURE LAYER FOR BATTERY, ELECTROLYTE LAYER, SHEET FOR BATTERY, BATTERY, AND RESIN COMPOSITION PRODUCTION METHOD

(71) Applicants: IDEMITSU KOSAN CO., LTD., Chiyoda-ku (JP); OSAKA RESEARCH INSTITUTE OF INDUSTRIAL SCIENCE AND TECHNOLOGY, Izumi (JP)

(72) Inventors: Atsutaka Kato, Osaka (JP); Mari Yamamoto, Osaka (JP); Masanari Takahashi, Osaka (JP); Futoshi Utsuno, Sodegaura (JP); Hiroyuki Higuchi, Sodegaura (JP)

(73) Assignees: IDEMITSU KOSAN CO., LTD., Chiyoda-ku (JP); OSAKA RESEARCH INSTITUTE OF INDUSTRIAL SCIENCE AND TECHNOLOGY, Izumi (JP)

( * ) Notice: Subject to any disclaimer, the term of this patent is extended or adjusted under 35 U.S.C. 154(b) by 623 days.

(21) Appl. No.: 18/251,966

(22) PCT Filed: Nov. 5, 2021

(86) PCT No.: PCT/JP2021/040760

§ 371 (c)(1),
(2) Date: May 5, 2023

(87) PCT Pub. No.: WO2022/097717

PCT Pub. Date: May 12, 2022

(65) Prior Publication Data

US 2024/0010813 A1 Jan. 11, 2024

(30) Foreign Application Priority Data

Nov. 9, 2020 (JP) ................................ 2020-186337

(51) Int. Cl.
*C08K 3/32* (2006.01)
*C08L 53/02* (2006.01)
(Continued)

(52) U.S. Cl.
CPC ................ *C08K 3/32* (2013.01); *C08L 53/02* (2013.01); *H01B 1/10* (2013.01); *H01M 4/13* (2013.01);
(Continued)

(58) Field of Classification Search
CPC .. C08K 3/32; H01B 1/10; H01M 4/13; H01M 4/662; H01M 10/052; H01M 10/0562; C08L 2207/04
(Continued)

(56) References Cited

U.S. PATENT DOCUMENTS

| | | | |
|---|---|---|---|
| 4,803,250 | A | 2/1989 | Nagasaki et al. |
| 4,960,833 | A | 10/1990 | Nagasaki et al. |

(Continued)

FOREIGN PATENT DOCUMENTS

| | | | |
|---|---|---|---|
| EP | 3 598 462 | A1 | 1/2020 |
| JP | 61-166844 | A | 7/1986 |

(Continued)

OTHER PUBLICATIONS

International Search Report issued Jan. 18, 2022 in PCT/JP2021/040760, 3 pages.

(Continued)

*Primary Examiner* — Ruiyun Zhang
(74) *Attorney, Agent, or Firm* — Oblon, McClelland, Maier & Neustadt, L.L.P.

(57) ABSTRACT

A resin composition may contain a compound including phosphorus and sulfur as constituent elements and having a
(Continued)

disulfide bond, and a thermoplastic resin. The first compound may have a peak observed by Raman spectroscopy derived from a disulfide bond which bonds two phosphorus elements. The thermoplastic resin may be a styrene-butadiene-based thermoplastic elastomer, a cellulose ether, a carboxymethylcellulose, a fluorine-based resin, a polyether, a polyacrylonitrile, a polyvinylacetate, a polymethyl methacrylate, a polyphosphazene, a polyvinylpyrrolidone, a polyethylene oxide, a polyacrylic acid, and/or a polyamideimide resin.

20 Claims, 1 Drawing Sheet

(51) Int. Cl.

| | |
|---|---|
| ***H01B 1/10*** | (2006.01) |
| ***H01M 4/13*** | (2010.01) |
| ***H01M 4/62*** | (2006.01) |
| ***H01M 10/052*** | (2010.01) |
| ***H01M 10/0562*** | (2010.01) |

(52) U.S. Cl.
CPC ......... *H01M 4/622* (2013.01); *H01M 10/052* (2013.01); *H01M 10/0562* (2013.01); *C08L 2203/20* (2013.01); *C08L 2207/04* (2013.01); *H01M 2300/0068* (2013.01)

(58) Field of Classification Search
USPC .......................................................... 524/415
See application file for complete search history.

(56) References Cited

U.S. PATENT DOCUMENTS

| | | | | |
|---|---|---|---|---|
| 2017/0133713 | A1 | 5/2017 | Makino et al. | |
| 2018/0241007 | A1* | 8/2018 | Pschenitzka | H10K 50/81 |
| 2018/0316057 | A1 | 11/2018 | Sasaki | |
| 2020/0373612 | A1 | 11/2020 | Yamada et al. | |
| 2022/0376291 | A1* | 11/2022 | Kato | C01D 15/00 |

FOREIGN PATENT DOCUMENTS

| | | | |
|---|---|---|---|
| JP | 5-331 479 | A | 12/1993 |
| JP | 2018-29058 | A | 2/2018 |
| JP | 2018-152290 | A | 9/2018 |
| JP | 2018-186077 | A | 11/2018 |
| JP | 2021-86796 | A | 6/2021 |
| WO | WO 2019/140368 | A1 | 7/2019 |
| WO | WO 2021/010479 | A1 | 1/2021 |

OTHER PUBLICATIONS

International Preliminary Report on Patentability and Written Opinion issued May 19, 2023 in PCT/JP2021/040760 (Submitting English Translation only), 8 pages.
Liu et al., "Polymeric membrane silver-ion selective electrodes based on bis (dialkyldithiophosphates)", Analytica Chimica ACTA, vol. 416, 2000, pp. 139-144.
Hu et al., "Organophosphorus compounds. I. The Chlorination of O, O-diethyldithiophosphoric acids", Acta Chim. Sinica, vol. 22, 1956, pp. 59-54 (with English Abstract).
Choi et al., "LiI-Doped Sulfide Solid Electrolyte: Enabling a High-Capacity Slurry-Cast Electrode by Low-Temperature Post-Sintering for Practical All-Solid-State Lithium Batteries", ACS Applied Materials & Interfaces, vol. 10, 2018, pp. 31404-31412.
Sumita et al., "Possible Polymerization of PS4 at a Li3PS4/FePO4 Interface with Reduction of the FePO4 Phase," The Journal of Physical Chemistry C, vol. 121, Apr. 24, 2017, pp. 9698-9704.
Hakari et al., "Structural and Electronic-State Changes of a Sulfide Solid Electrolyte during the Li Deinsertion-Insertion Processes," Chemistry of Materials, vol. 29, May 3, 2017, pp. 4768-4774.
"Chemical Structural Analysis of Sulfide-based Solid Electrolyte 70Li2S—30P2S5," Toray Research Center, Inc., retrieved from the Internet <URL: https://www.toray-research.co.jp/technical-info/tronews/pdf/201802-01.pdf>, Feb. 1, 2018, pp. 1-4 (total 5 pages) (with English Abstract).
Extended European Search Report issued Mar. 27, 2025, in corresponding European Patent Application No. 21889269.3, 11 pages.
Kato A. et al., "Lithium-ion-conductive sulfide polymer electrolyte with disulfide bond-linked PS4 tetrahedra for all-solid-state batteries", Database accession No. E20214511141188, Communications Materials 20211201 Springer Nature GBR, vol. 2, No. 1. Dec. 1, 2021, 2 pages.

* cited by examiner

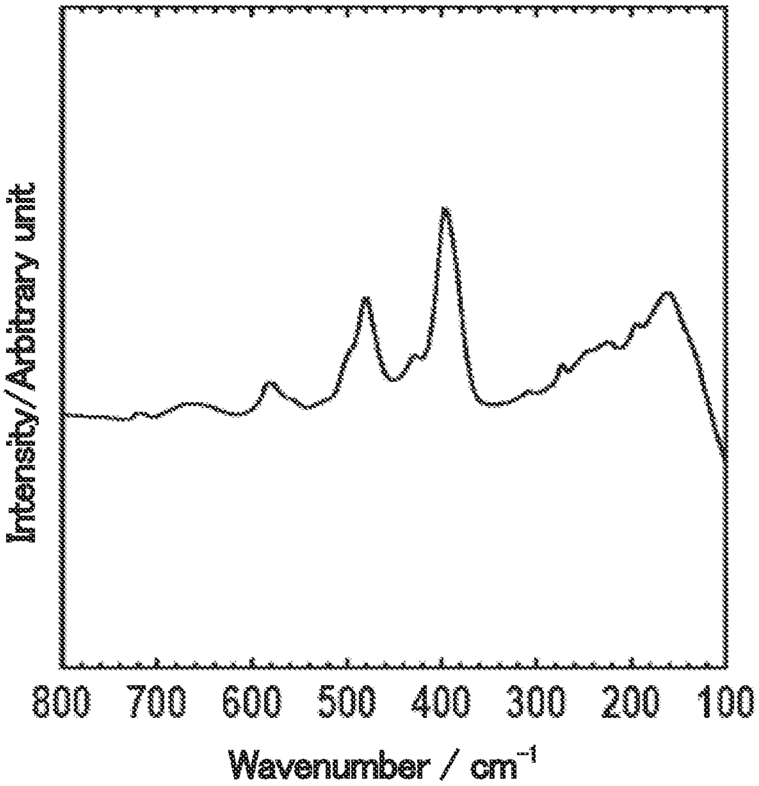
Intensity/Arbitrary unit
800
700
600
500
400
300
200
100
Wavenumber / cm⁻¹

RESIN COMPOSITION, BINDER FOR BATTERY, ELECTRODE MIXTURE LAYER FOR BATTERY, ELECTROLYTE LAYER, SHEET FOR BATTERY, BATTERY, AND RESIN COMPOSITION PRODUCTION METHOD

CROSS REFERENCE TO RELATED APPLICATIONS

This application is a National Stage entry under 35 U.S.C. § 371 of PCT/JP2021/040760, filed on Nov. 5, 2021, and claims priority to Japanese Patent Application No. 2020-186337, filed on Nov. 9, 2020, the entire contents of which are incorporated herein by reference.

TECHNICAL FIELD

The invention relates to a resin composition that can be used as a binder fora battery and can suppress a decrease in ion conductivity, a binder for a battery, a composite electrode layer for a battery, an electrolyte layer, a sheet fora battery, a battery, and a method for producing a resin composition.

BACKGROUND ART

An all-solid-state battery, such as an all-solid-state lithium-ion battery, usually has a positive electrode layer, a solid electrolyte layer (sometimes simply referred to as an "electrolyte layer"), and a negative electrode layer. By containing a binder in these layers, each layer or a stacked body thereof can be formed into a sheet.

Non-Patent Documents 1 and 2 disclose the polymerization of $PS_4$ on the surface of an electrode active material. In addition, Non-Patent Document 3 discloses change of a chemical structure of $70Li_2S-30P_2S_5$ through heat treatment.

RELATED ART DOCUMENTS

Non-Patent Document

[Non-Patent Document 1] Masato Sumita, and 2 others, "Possible Polymerization of $PS_4$ at a $Li_3PS_4/FePO_4$ Interface with Reduction of the $FePO_4$ Phase," The Journal of Physical Chemistry C, Apr. 24, 2017, Volume 121, p. 9698-9704

[Non-Patent Document 2] Takashi Hakari, and 9 others, "Structural and Electronic-State Changes of a Sulfide Solid Electrolyte during the Li Deinsertion-Insertion Processes," Chemistry of Materials, May 3, 2017, Volume 29, p. 4768-4774

[Non-Patent Document 3] Yuichi Hasegawa, "Chemical Structural Analysis of Sulfide-based Solid Electrolyte $70Li_2S-30P_2S_5$," [online], Feb. 1, 2018, Toray Research Center, Inc. [Search on Jul. 9, 2019], Internet <URL: https://www.toray-research.co.jp/technical-info/trcnews/pdf/201802-01.pdf>

SUMMARY OF THE INVENTION

It is conceivable to use polyvinylidene fluoride (PVDF), carboxymethylcellulose (CMC), or the like as a binder. However, such a binder has a problem that ion conductivity decreases when the amount of the binder is increased in order to obtain the bonding property between the materials constituting a layer (for example, an electrode mixture).

An object of the invention is to provide a resin composition which can be used as a binder for a battery and which can suppress decrease in ion conductivity.

As a result of intensive studies, the inventors have found that a resin composition including a compound containing phosphorus and sulfur as constituent elements and having a disulfide bond, and a thermoplastic resin can be used as a binder which has ion conductivity, thereby completing the invention.

According to the invention, the following resin composition and so on can be provided.

1. A resin composition comprising a compound comprising phosphorus and sulfur as constituent elements and having a disulfide bond, and a thermoplastic resin.
2. The resin composition according to 1, wherein the compound is obtained by oxidizing a raw material compound comprising phosphorus and sulfur as constituent elements with an oxidizing agent.
3. The resin composition according to 1 or 2, wherein the compound has a disulfide bond formed by any of the following reaction schemes (1) to (3):

(1)

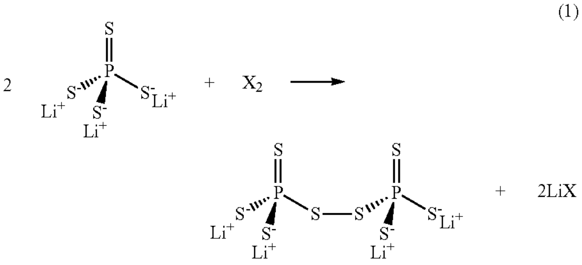

(2)

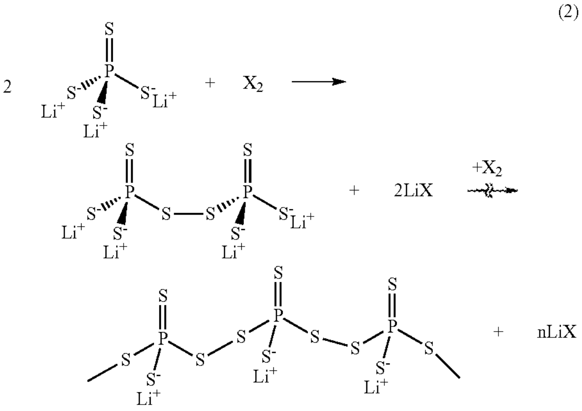

(3)

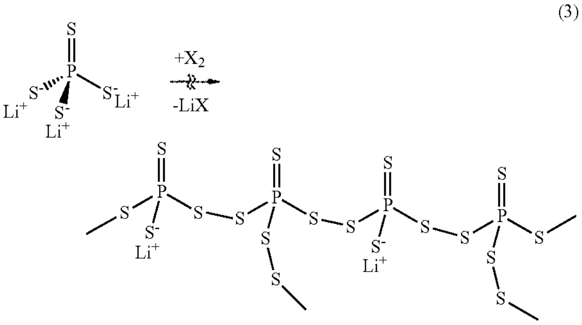

wherein in the schemes, X is halogen, and n is an integer.

4. The resin composition according to 3, wherein X in the reaction schemes (1) to (3) is iodine (I), fluorine (F), chlorine (Cl), or bromine (Br).

5. The resin composition according to any one of 1 to 4, wherein the compound has a peak observed by Raman spectroscopy derived from a disulfide bond which bonds two phosphorus elements.
6. The resin composition according to any one of 1 to 5, wherein the thermoplastic resin is at least one selected from the group consisting of a styrene-butadiene-based thermoplastic elastomer, a cellulose ether, a carboxymethylcellulose, a fluorine-based resin, a polyether, a polyacrylonitrile, a polyvinylacetate, a polymethyl methacrylate, a polyphosphazene, a polyvinylpyrrolidone, a polyethylene oxide, a polyacrylic acid, and a polyamideimide resin.
7. The resin composition according to any one of 1 to 6, wherein the compound comprises one or more selected from the group consisting of lithium, sodium, magnesium, and aluminum as a constituent element.
8. The resin composition according to any one of 1 to 7, further comprising a halogen.
9. The resin composition according to 8, wherein the halogen is iodine or bromine.
10. A binder for a battery, comprising the resin composition according to any one of 1 to 9.
11. A composite electrode layer for a battery or an electrolyte layer for a battery comprising the binder for a battery according to 10.
12. The composite electrode layer for a battery or the electrolyte layer for a battery according to 11, further comprising a solid electrolyte other than the binder for a battery.
13. A sheet for a battery having at least one selected from the group consisting of a composite electrode layer for a battery and an electrolyte layer for a battery according to 11 or 12.
14. A battery comprising the resin composition according to any one of 1 to 9.
15. A method for producing a resin composition comprising adding an oxidizing agent to a raw material compound comprising phosphorus and sulfur as constituent elements to oxidize the raw material compound, and mixing the compound obtained by the oxidation with a thermoplastic resin.

According to the invention, a resin composition that can be used as a binder fora battery having ion conductivity can be provided.

BRIEF DESCRIPTION OF THE DRAWINGS

The FIGURE is a Raman spectrum of the compound a obtained in Example 1.

MODE FOR CARRYING OUT THE INVENTION

Hereinafter, the resin composition, a binder for a battery, a composite electrode layer for a battery, an electrolyte layer, a battery sheet, a battery, and a method for producing a resin composition of the invention will be described in detail.

In this specification, "x to y" represents a numerical value range of "x or more and y or less." The upper and lower limits stated for the numerical value range can be combined arbitrarily.

Combinations of two or more of the individual embodiments of the invention described later are also embodiments of the invention.

1. Resin Composition

A resin composition according to an aspect of the invention contains a compound containing phosphorus and sulfur as constituent elements and having a disulfide bond (hereinafter, also referred to as "compound α") and a thermoplastic resin.

Such a resin composition can be widely used as a binder having ion conductivity in various applications including a battery.

<Compound α>

The compound α contains phosphorus and sulfur as constituent elements and has a disulfide bond.

In one embodiment, the compound α has a peak observed by Raman spectroscopy derived from a disulfide bond which bonds two phosphorus elements.

In one embodiment, the compound α can be identified by having a peak observed by Raman spectroscopy in a range of Raman shift 425 $cm^{-1}$ or more and 500 $cm^{-1}$ or less, preferably 440 $cm^{-1}$ or more and 490 $cm^{-1}$ or less, more preferably 460 $cm^{-1}$ or more and 480 $cm^{-1}$ or less (hereinafter, also referred to as "peak A"), and having a peak observed by Raman spectroscopy in a range of Raman shift 370 $cm^{-1}$ or more and 425 $cm^{-1}$ or less, preferably 380 $cm^{-1}$ or more and 423 $cm^{-1}$ or less, more preferably 390 $cm^{-1}$ or more and 420 $cm^{-1}$ or less (hereinafter, also referred to as "peak B").

It should be noted that the presence of a disulfide bond (S—S) in the compound α according to one embodiment of the invention may be identified by the presence of the peak A.

The peak A is derived from the disulfide bond (S—S) which bonds two phosphorus elements in the compound α. The peak B is derived from symmetrical stretching of P—S bonding in a $PS_4^{3-}$ unit (also referred to as $PS_4$ structure).

Raman spectroscopy of the compound α is performed by the method described in Examples. At the time of analysis, it is important to carry out measurement about the compound α after treatment with toluene. This is for the reason why the elemental sulfur which may be mixed in the compound α is removed. The elemental sulfur has a peak at the position that may overlap with the peak A. Therefore, by removing the elemental sulfur, the peak A derived from the compound α can be measured properly. Such a treatment with toluene is performed according to the procedure described in Examples.

The compound α according to one embodiment of the invention preferably contains one or more elements selected from the group consisting of lithium, sodium, and magnesium as constituent elements. In one embodiment, these constituent elements are bonded to S in the compound α via an ionic bond.

<Thermoplastic Resin>

The thermoplastic resin contained in the resin composition is not particularly limited.

In one embodiment, the thermoplastic resin is one or more selected from the group consisting of styrene-butadiene-based thermoplastic elastomer (SBS), cellulose derivatives represented by ethyl cellulose, carboxymethyl cellulose (CMC), and the like, fluorine-based resins represented by polyvinylidene fluoride, polyvinylidene fluoride-hexafluoropropylene copolymer (PVdF-HFP), and the like, polyethers represented by polyethylene oxide (PEO), polypropylene oxide, and the like, polyacrylonitrile, polyvinyl acetate, polymethyl methacrylate, polyphosphazene, polyvinyl pyrrolidone, polyacrylic acid, and polyamideimide resin.

Examples of the styrene-butadiene-based thermoplastic elastomer (SBS) include a block copolymer of polystyrene forming a hard segment, and polybutadiene forming a soft segment.

The mass ratio of the compound α and the thermoplastic resin in the resin composition is not particularly limited.

In one embodiment, the mass ratio of the compound α to the thermoplastic resin (compound α:thermoplastic resin) in the resin composition is 99:1 to 1:99, 95:5 to 5:95, 90:10 to 10:90, 85:15 to 15:85, 80:20 to 20:80, 75:25 to 25:75, or 70:30 to 30:70.

<Halogen>

In one embodiment, the resin composition further contains a halogen (halogen-containing substance). Such a halogen may be one derived from an oxidizing agent or the like used in the production of the compound α.

In one embodiment, the halogen is one or more selected from the group consisting of iodine, fluorine, chlorine, and bromine.

In one embodiment, the halogen is one or more selected from the group consisting of iodine and bromine.

The form of the halogen described above is not particularly limited, and may be, for example, one or more selected from the group consisting of salts of a halogen with one or more elements selected from the group consisting of lithium, sodium, magnesium, and aluminum, and elemental halogens. Examples of the salt include LiI, NaI, $MgI_2$, $AlI_3$, LiBr, NaBr, $MgBr_2$, $AlBr_3$, and the like. Among these, LiI and LiBr are preferable from the viewpoint of ion conductivity. Examples of the elemental halogen include iodine ($I_2$), fluorine ($F_2$), chlorine ($Cl_2$), bromine ($Br_2$), and the like. Among these, iodine ($I_2$) and bromine ($Br_2$) are preferable from the viewpoint of reducing corrosion when remaining in the binder (A).

In one embodiment, the binder for a battery (A) may have higher ion conductivity by containing halogen as the salt described above.

The content of the halogen-containing substance (elemental halogen or halogen compound) in the resin composition is not particularly limited, and for example, from the viewpoint of the conductivity of ions serving as carriers and the bonding strength of an active material or a solid electrolyte, the content may be 50% by mass or less, 40% by mass or less, 30% by mass or less, 20% by mass or less, 15% by mass or less, 10% by mass or less, 8% by mass or less, 5% by mass or less, 3% by mass or less, 2% by mass or less, 1% by mass or less, 0.5% by mass or less, 0.1% by mass or less, 0.05% by mass or less, or 0.01% by mass or less, based on the entire mass of the resin composition of 100% by mass.

The content of the compound α, the thermoplastic resin, and the halogen-containing substance in the resin composition is not particularly limited.

In one embodiment, of the resin composition, the compound α and the thermoplastic resin, or the compound a, the thermoplastic resin, and the halogen-containing substance occupied 50% by mass or more, 60% by mass or more, 70% by mass or more, 80% by mass or more, 85% by mass or more, 90% by mass or more, 95% by mass or more, 98% by mass or more, 99% by mass or more, 99.5% by mass or more, 99.8% by mass or more, 99.9% by mass or more, or substantially 100% by mass of the resin composition.

In the case of "substantially 100% by mass", inevitable impurities may be included in the resin composition.

2. Binder for Battery

A binder for a battery according to one aspect of the invention (hereinafter, referred to as the binder for a battery (A)) contains the resin composition described above.

In one embodiment, the binder for a battery (A) consist of the resin composition described above.

The binder fora battery (A) can be used for various batteries. Examples of the battery include a secondary battery such as a lithium-ion battery. In addition, the battery may be an all-solid-state battery. The "binder" is blended into one or more elements selected from the group consisting of, for example, a composite electrode layer for a battery and an electrolyte layer for a battery in such a battery, and can exhibit bonding properties (also referred to as "bonding strength" and "adhesive strength") for maintaining integrity of the element by bonding other components with each other contained in the element (for example, layer).

A conventional composite electrode layer for a battery (for example, a positive electrode or a negative electrode as described later) is difficult to follow the expansion and contraction (volume change) of the electrode active material caused by charging and discharging or the like, and is likely to cause problems such as capacity deterioration. The electrolyte layer adjacent to the composite electrode layer for a battery may also be affected by a volume change of the composite electrode layer for a battery, which may cause problems such as deterioration. On the other hand, by using the binder for a battery (A), a volume change of the composite electrode layer fora battery or the electrolyte layer for a battery can be absorbed due to the flexibility of the binder for a battery (A), thereby preventing capacity deterioration and the like. As a result, the battery can exhibit excellent cycle characteristics. Further, since the binder for a battery (A) itself may have ion conductivity, even if the amount of the binder for a battery (A) is increased in order to enhance the bonding property between the materials constituting the layer (for example, an electrode mixture), the decrease in the ion conductivity can be suppressed, and the battery characteristics can be favorably exhibited. Further, in one embodiment, the binder for a battery (A) is superior in heat resistance as compared with a conventional organic binder or a polymer solid electrolyte (for example, polyethylene oxide, and the like), so that the operating temperature range of the battery can be expanded.

In addition, since the thermoplastic resin functions as a thickener, the binder for a battery (A) has an effect of increasing coating property. For example, a coating liquid (slurry) obtained by adding a solvent described later to the binder for a battery (A) can provide an excellent effect in coating property. As a result, an effect of increasing coating uniformity can also be obtained.

Further, the ion conductivity of the binder for a battery (A) can be adjusted by selecting a kind of thermoplastic resins. For example, the ion conductivity can be increased by selecting a polymer electrolyte such as a polyethylene oxide composite material containing an electrolyte salt as the a thermoplastic resin.

3. Composite Electrode Layer for Battery or Electrolyte Layer for Battery

The composite electrode layer for a battery or the electrolyte layer for a battery according to one aspect of the invention contains the above-described binder fora battery (A).

In one embodiment, the binder for a battery (A) is unevenly distributed or uniformly distributed (dispersed) in the composite electrode layer for a battery or the electrolyte layer for a battery. In one embodiment, by the binder for a battery (A) being uniformly distributed (dispersed) in the layer, the layer integrity is maintained better.

The composite electrode layer for a battery or the electrolyte layer for a battery preferably contains a solid electrolyte other than the binder for a battery (A) (hereinafter, referred to as a solid electrolyte (B)). The solid electrolyte (B) is not particularly limited, and for example, an oxide solid electrolyte or a sulfide solid electrolyte can be used.

Among these, a sulfide solid electrolyte is preferable, and specific examples thereof include sulfide solid electrolytes having an argyrodite-type crystal structure, a $Li_3PS_4$ crystal structure, a $Li_4P_2S_6$ crystal structure, a $Li_7P_3S_{11}$ crystal structure, a $Li_{4-x}Ge_{1-x}P_xS_4$-based thio-LISICON Region II-type crystal structure, a crystal structure similar to that of $Li_{4-x}Ge_{1-x}P_xS_4$-based thio-LISICON Region II-type (hereinafter, sometimes abbreviated as RII-type crystal), and the like.

Examples of the composite electrode layer for a battery include a positive electrode, a negative electrode, and the like.

When the composite electrode layer for a battery is a positive electrode, the positive electrode may further contain a positive electrode active material. The positive electrode active material is a material capable of intercalating and desorbing lithium ions, and materials publicly known as a positive electrode active material in the field of batteries can be used.

Examples of the positive electrode active material include metal oxides, sulfides, and the like. Sulfides include metal sulfides and non-metal sulfides.

Examples of the metal oxide include, for example, transition metal oxides. Specifically, examples thereof include $V_2O_5$, $V_6O_{13}$, $LiCoO_2$, $LiNiO_2$, $LiMnO_2$, $LiMn_2O_4$, $Li(Ni_aCo_bMn_c)O_2$ (where $0<a<1$, $0<b<1$, $0<c<1$, $a+b+c=1$), $LiNi_{1-Y}Co_YO_2$, $LiCo_{1-Y}Mn_YO_2$, $LiNi_{1-Y}Mn_YO_2$ (where $0\leq Y<1$), $Li(Ni_aCo_bMn_c)O_4$ (where $0<a<2$, $0<b<2$, $0<c<2$, $a+b+c=2$), $LiMn_{2-Z}Ni_ZO_4$, $LiMn_{2-Z}Co_ZO_4$ (where $0<Z<2$), $LiCoPO_4$, $LiFePO_4$, CuO, $Li(Ni_aCo_bAl_c)O_2$ (where $0<a<1$, $0<b<1$, $0<c<1$, $a+b+c=1$), and the like.

Examples of the metal sulfide include lithium sulfide ($Li_2S$), lithium polysulfide ($Li_2Sx$, $1<x\leq 8$), titanium sulfide ($TiS_2$), molybdenum sulfide ($MoS_2$), iron sulfide (FeS, $FeS_2$), copper sulfide (CuS), nickel sulfide ($Ni_3S_2$), and the like.

In addition, examples of the metal oxide include bismuth oxide ($Bi_2O_3$), bismuth leadate ($Bi_2Pb_2O_5$), and the like.

Examples of the non-metal sulfide include elemental sulfur, an organic disulfide compound, a carbon sulfide compound, and the like.

In addition to those mentioned above, niobium selenide ($NbSe_3$), metal indium, and sulfur can also be used as the positive electrode active material.

When the composite electrode layer for a battery is a negative electrode, the negative electrode may further contain a negative electrode active material.

As the negative electrode active material, materials commonly used in a lithium-ion secondary battery can be used, such as carbon materials such as graphite, natural graphite, artificial graphite, hard carbon, and soft carbon; composite metal oxides such as a polyacene-based conductive polymer and lithium titanate; and compounds capable of forming an alloy with lithium such as silicon, a silicon alloy, a silicon composite oxide, tin, and a tin alloy. The negative electrode active material preferably contains one or more selected from the group consisting of Si (silicon, silicon alloy, silicon-graphite complex, silicon complex oxide, and the like) and Sn (tin, and tin alloy).

One or both of the positive electrode and the negative electrode may contain a conductive aid. When the electron conductivity of the active material is low, it is preferable to add a conductive aid. As a result, the rate characteristics of a battery can be increased.

Specific examples of the conductive aid include a material containing at least one element selected from the group consisting of carbon material, nickel, copper, aluminum, indium, silver, cobalt, magnesium, lithium, chromium, gold, ruthenium, platinum, beryllium, iridium, molybdenum, niobium, osmium, rhodium, tungsten, and zinc, more preferably an elemental carbon having high conductivity and carbon materials other than elemental carbon; and elemental metals, mixtures, and compounds containing nickel, copper, silver, cobalt, magnesium, lithium, ruthenium, gold, platinum, niobium, osmium, and rhodium.

Specific examples of the carbon material include carbon black such as Ketjenblack black, acetylene black, Denka black, thermal black, and channel black; graphite, carbon fibers, and activated carbon. The carbon material may be used alone or in combination of two or more. Among these, Denka black having high electron conductivity, acetylene black, and Ketjenblack black are preferable.

The electrolyte layer contains the binder for a battery (A), and may contain a solid electrolyte (B) other than the binder for a battery (A) as an arbitrary component.

The composition of the positive electrode is not particularly limited, and for example, a mass ratio of positive electrode active material:solid electrolyte (B):binder for a battery (A):conductive aid may be 50 to 99:0 to 30:1 to 30:0 to 30.

Of the positive electrode, 30% by mass or more, 50% by mass or more, 80% by mass or more, 90% by mass or more, 95% by mass or more, 98% by mass or more, or 99% by mass or more may be occupied by a positive active material, a solid electrolyte (B), the binder for a battery (A), and a conductive aid.

The composition of the negative electrode is not particularly limited, and for example, a mass ratio of negative electrode active material:solid electrolyte (B):binder for a battery (A):conductive aid may be 40 to 99:0 to 30:1 to 30:0 to 30.

Of the negative electrode, 30% by mass or more, 50% by mass or more, 80% by mass or more, 90% by mass or more, 95% by mass or more, 98% by mass or more, or 99% by mass or more may be occupied by a negative active material, a solid electrolyte (B), the binder for a battery (A), and a conductive aid.

The composition of the electrolyte layer is not particularly limited, and for example, a mass ratio of solid electrolyte (B):binder for a battery (A) may be 99.9:0.1 to 0:100.

When the mass ratio of a solid electrolyte (B) is 0, the binder for a battery (A) can also serve as a solid electrolyte.

Of the electrolyte layer, 30% by mass or more, 50% by mass or more, 80% by mass or more, 90% by mass or more, 95% by mass or more, 98% by mass or more, 99% by mass or more, or 99.9% by mass or more may be occupied by a solid electrolyte (B) and the binder for a battery (A).

The method of forming a layer containing the compound α and a thermoplastic resin, for example, the method of forming each layer constituting the above-described battery is not particularly limited, and examples thereof include a coating method. In the coating method, a coating liquid in which components contained in each layer are dissolved or dispersed in a solvent can be used. As the solvent contained in the coating liquid, chain, cyclic, or aromatic ethers (for example, dimethyl ether, dibutyl ether, tetrahydrofuran, anisole, etc.), esters (for example, ethyl acetate, ethyl propionate, etc.), alcohols (for example, methanol, ethanol, etc.), amines (for example, tributylamine, etc.), amides (for example, N-methylformamide, etc.), lactams (for example, N-methyl-2-pyrrolidone, etc.), hydrazine, acetonitrile, and the like can be used. A layer (dried coating film) is formed by evaporating the solvent after application of the coating liquid. From the viewpoint of easiness of evaporating the solvent, anisole is preferable. The evaporation method is not particularly limited, and for example, one or more means selected from the group consisting of heat drying, blow drying, and decompression drying (including vacuum drying) can be used.

The member to be coated with the coating liquid is not particularly limited. The formed layer may be used in a battery together with the member, or the formed layer peeled off from the member may be used in a battery. In one embodiment, the coating liquid for forming a positive electrode is applied on a positive electrode current collector. In one embodiment, the coating liquid for forming a negative electrode is applied on a negative electrode current collector. In one embodiment, the coating liquid for forming an electrolyte layer is applied on a positive electrode or a negative electrode. In one embodiment, the coating liquid for forming an electrolyte layer is applied on a member that can be easily peeled off, and then the formed layer is peeled off from the member, and is disposed between a positive electrode and a negative electrode.

It is preferable to press the dried coating film (layer). The pressing may be any means that presses the layer to compress it. For example, a press can be applied to reduce the porosity of the layer. The pressing device is not particularly limited, and for example, a roll press, a uniaxial press, or the like can be used. The temperature at the time of pressing is not particularly limited, and may be about room temperature (23° C.) or may be lower or higher than room temperature. By applying the press, a binder for a battery (A) contained in the layer is suitably deformed due to its flexibility, and formation of the interface between the electrode mixtures contained in the layer is promoted. The pressing makes the battery characteristics more increased.

The pressing may be performed for a layer-by-layer, or may be performed so as to press a stack of a plurality of layers (for example, a "battery sheet" to be described later) in the stacking direction of the layers.

4. Battery Sheet

The battery sheet according to one aspect of the invention has at least one layer selected from the group consisting of the composite electrode layer and the electrolyte layer described above. The battery sheet contains the compound α and the thermoplastic resin, or the binder for a battery (A), so that the battery sheet exhibits excellent flexibility, and is prevented from breakage and peeling from the current collector.

5. Battery

A battery according to one aspect of the invention contains the resin composition described above.

In one embodiment, the battery is an all-solid-state battery.

In one embodiment, the all-solid-state battery includes a stacked body having a positive electrode current collector, a positive electrode, an electrolyte layer, a negative electrode, and a negative electrode current collector in this order. For the current collector, a plate-like body, a foil-like body, and so on, which is formed of copper, magnesium, stainless steel, titanium, iron, cobalt, nickel, zinc, aluminum, germanium, indium, lithium, an alloy thereof, or the like may be used.

In the battery, it is preferred that the resin composition be contained in at least one selected from the group consisting of a positive electrode, an electrolyte layer, and a negative electrode.

In the above description (and Examples described later), the case where the resin composition according to the invention is used for a battery has been mainly described, but the use of the resin composition according to the invention is not limited to the battery. The resin composition according to the invention is excellent in flexibility, ion conductivity, and the like, and thus can be widely applied to various applications.

6. Method for Producing Compound α

The method for producing the compound α described above is not particularly limited.

In one embodiment, a method for producing a compound α includes: adding an oxidizing agent to a raw material compound containing phosphorus and sulfur as constituent elements, and reacting the raw material compound with the oxidizing agent.

The reaction of the raw material compound with the oxidizing agent gives a compound α as a product.

In one embodiment, the compound α is obtained by oxidizing a raw material compound containing phosphorus and sulfur as constituent elements with an oxidizing agent.

In one embodiment, the raw material compound (hereinafter, referred to as the raw material compound (C)) contains phosphorus and sulfur as constituent elements.

The raw material compound (C) preferably contains one or more elements selected from the group consisting of lithium, sodium, magnesium, and aluminum, as constituent elements.

In one embodiment, the raw material compound (C) preferably has a $PS_4$ structure. Examples of the raw material compound having a $PS_4$ structure include $Li_3PS_4$, $Li_4P_2S_7$, $Na_3PS_4$, $Na_4P_2S_7$, and the like. The raw material compound (C) may have two or more $PS_4$ structures, such as $Li_4P_2S_7$, $Na_4P_2S_7$, and the like. Here, when the raw material compound (C) has two $PS_4$ structures adjacent to each other, the two $PS_4$ structures may share one S atom.

$Li_3PS_4$ can be produced, for example, by reacting $Li_2S$ with $P_2S_5$ in the presence of a dispersing medium by a mechanochemical process (mechanical milling). Examples of the dispersing medium include n-heptane and the like. For the mechanochemical method, a planetary ball mill or the like can be used, for example.

In one embodiment, the compound α can be prepared by reading $Li_2S$, a $P_2S_5$, and an oxidizing agent by a mechanochemical process (mechanical milling) in the presence of a dispersing medium such as n-heptane. Here, for example, a planetary ball mill or the like can be also used for the mechanochemical method.

In the above description, $Na_2S$ may be used in place of $Li_2S$.

Examples of the oxidizing agent include elemental halogen, oxygen, ozone, oxides ($Fe_2O_3$, $MnO_2$, $Cu_2O$, $Ag_2O$, etc.), oxoates (chlorate, hypochlorite, iodate, bromate, chromate, permanganate, vanadate, bismuthate, etc.), peroxides (lithium peroxide, sodium peroxide, etc.), halide salts (AgI, CuI, $PbI_2$, AgBr, CuCl, etc.), cyanide salts (AgCN, etc.), thiocyanate salts (AgSCN, etc.), and sulfoxides (dimethylsulfoxide, etc.). In one embodiment, the oxidizing agent is preferably an elemental halogen from the viewpoint of enhancing the ion conductivity by the metal halide generated as a by-product. The "metal halide" may be a salt of a halogen with one or more elements selected from the group consisting of lithium, sodium, magnesium, and aluminum, which are derived from the raw material compound (C) (for example, lithium halide in the case where the raw material compound (C) contains lithium) or the like.

Examples of the elemental halogen include iodine ($I_2$), fluorine ($F_2$), chlorine ($Cl_2$), and bromine ($Br_2$). The elemental halogen is preferable iodine ($I_2$) or bromine ($Br_2$) from the viewpoint of obtaining higher ion conductivity.

The oxidizing agent may be used in one kind alone, or in combination of two or more.

In one embodiment, when the raw material compound (C) is $Li_3PS_4$ and the oxidizing agent is an elemental halogen ($X_2$), the reaction proceeds as shown in Reaction Schemes (1) to (3) below. In one embodiment, a compound α has a P—S—S chain (a chain formed by repeating units of P—S—S) (Reaction Schemes (1) and (2)). In one embodiment, the P—S—S chain of the compound α form a branch (branching) (Reaction Scheme (3)). In one embodiment, two phosphorus elements and a disulfide bond which bonds the two phosphorus elements constitute a P—S—S chain.

(1)

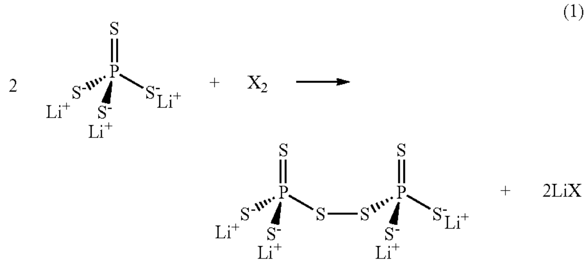

(2)

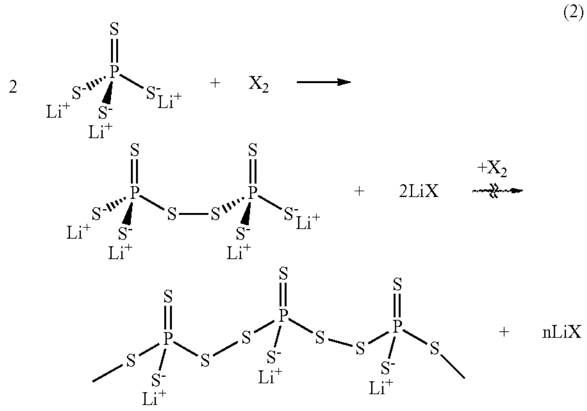

(3)

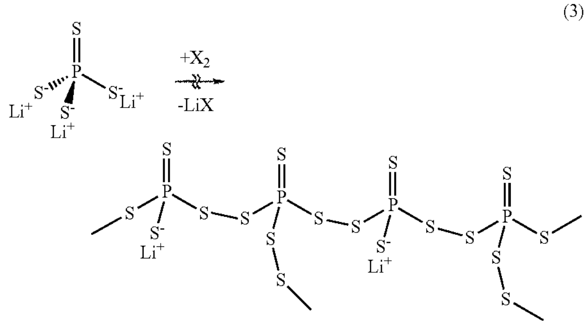

wherein in the Schemes, X is halogen and n is an integer.

In one embodiment, the compound α has a disulfide bond formed by any of Reaction Schemes (1) to (3).

In one embodiment, X in Reaction Schemes (1) to (3) is iodine (I), fluorine (F), chlorine (Cl) or bromine (Br).

In one embodiment, X in Reaction Schemes (1) to (3) is iodine (I).

The molar ratio of $Li_3PS_4$ to $I_2$ ($Li_3PS_4$:$I_2$) to be reacted (blended) is not particularly limited and may be, for example, 10:1 to 1:10, 5:1 to 1:5, 3:1 to 1:3, 2:1 to 1:2, 4:3 to 3:4, 5:4 to 4:5, or 8:7 to 7:8. The blending amount of $I_2$ may be 0.1 parts by mole or more, 0.2 parts by mole or more, 0.5 parts by mole or more, 0.7 parts by mole or more, or 1 parts by mole or more, and may be 300 parts by mole or less, 250 parts by mole or less, 200 parts by mole or less, 180 parts by mole or less, 150 parts by mole or less, 130 parts by mole or less, 100 parts by mole or less, 80 parts by mole or less, 50 parts by mole or less, 30 parts by mole or less, 20 parts by mole or less, 15 parts by mole or less, 10 parts by mole or less, 8 parts by mole or less, 5 parts by mole or less, 3 parts by mole or less, or 2 parts by mole or less, based on 100 parts by mole of $Li_3PS_4$. The more the proportion of $I_2$, the longer the P—S—S chain can be extended.

The above molar ratio relationship is not limited to the case of reacting $Li_3PS_4$ and $I_2$, and can also be applied to the case of reacting, for example, a raw material compound having a $PS_m$(m=3, 3.5, 4) unit structure such as a $PS_4$ structure (or a raw material of the raw material compound; for example, a combination of $Li_2S$ and $P_2S_5$, a combination of $Na_2S$ and $P_2S_5$, and the like) with an elemental halogen.

In the step of reading a raw material compound (C) and an oxidizing agent (reaction step), the raw material compound (C) and the oxidizing agent are preferably reacted by using one or more energies selected from the group consisting of physical energy, thermal energy, and chemical energy.

In the reaction step, the raw material compound (C) and the oxidizing agent are preferably reacted by using an energy including physical energy. Physical energy can be supplied, for example, by using a mechanochemical process (mechanical milling). For the mechanochemical method, for example, a planetary ball mill or the like can be used.

In the mechanochemical process using a planetary ball mill and the like, the process conditions are not particularly limited, for example, the revolutions may be 100 rpm to 700 rpm, the processing time may be 1 hour to 100 hours, and the ball size may be 1 mm to 10 mm in diameter.

In the reaction step, a raw material compound (C) and an oxidizing agent are preferably reacted in a liquid. In this case, the raw material compound (C) and the oxidizing agent can be reacted in the presence of a dispersing medium. It is preferable to read a raw material compound (C) and an oxidizing agent in the presence of a dispersing medium by a mechanochemical method (mechanical milling) from the viewpoint of increasing the reactivity due to such mechanical energy.

Examples of the dispersing medium include an aprotic liquid and the like. The aprotic liquid is not particularly limited and examples thereof include, for example, chain or cyclic alkanes, preferably including 5 or more carbon atoms, such as n-heptanes; aromatic hydrocarbons such as, for example, benzene, toluene, xylene, anisole, and the like; chain or cyclic ethers such as dimethyl ether, dibutyl ether, tetrahydrofuran, and the like; alkyl halides such as chloroform, methylene chloride, and the like; esters such as ethyl propionate, and the like.

In one embodiment, when a raw material compound (C) and an oxidizing agent are reacted in a liquid, the reaction can be conducted in the state of one or both of the raw material compound (C) and the oxidizing agent being mixed with a solvent.

As the solvent, among the above-mentioned dispersing media, those capable of dissolving one or both of the raw material compound (C) and the oxidizing agent can be used, and for example, anisole, dibutyl ether, and the like are preferable.

Even in such a solution, the raw material compound (C) and the oxidizing agent can be reacted by the use of one or more energies selected from the group consisting of physical energy such as stirring, milling, ultrasonic vibration, and the like, thermal energy, and chemical energy. For example, when thermal energy is used, the solution can be heated. The heating temperature is not particularly limited and may be, for example, 40 to 200° C., 50 to 120° C., or 60 to 100° C.

In the reaction step, a compound α can be produced by oxidizing the raw material compound (C) with an oxidizing agent.

When a compound α is produced by the reaction in the liquid, the liquid (dispersion medium or solvent) can be removed as necessary. By removing the liquid, the compound α can be obtained in the stated of solid (powder). The method of removing the liquid is not particularly limited, and examples thereof include drying, solid-liquid separation, and the like, and two or more of these may be combined.

When solid-liquid separation is used, the compound α may be reprecipitated. At this time, a liquid containing the compound α can be added to a poor solvent (a poor solvent for the compound α) or a non-solvent (a solvent not dissolving the compound α), to recover the compound α as a solid (solid phase). For example, a method may be given in that an anisole solution containing the compound α is added to the poor solvent n-heptane, followed by solid-liquid separation. Method for conducting solid-liquid separation is not particularly limited, and examples thereof include an evaporation method, a filtration method, a centrifugal separation method, and the like. When solid-liquid separation is used, an effect of increasing purity can be obtained.

In one embodiment, the formation of a compound α is accompanied by the by-product of LiI. This LiI may or may not be separated from the compound α. As described above, By leaving LiI in the mixture with the compound α without completely removing it, the conductivity of the compound α can be increased more.

Here, the crystalline phase of LiI may be, for example, c-LiI (cubic) (ICSD 414244), h-LiI (hexagonal) (ICSD 414242), or the like. In general, when a compound α is produced by a mechanochemical method (mechanical milling), the crystalline phase of LiI becomes c-LiI (cubic), and when a compound α is produced by a method of reacting in a liquid (preferably in a solution), the crystalline phase of LiI becomes h-LiI (hexagonal).

It is possible to determine which crystalline phase LiI is by powder X-ray diffraction or solid-state $^7$Li-NMR measurement. In the solid-state $^7$Li-NMR measurement, when a peak derived from LiI (chemical shift-4.57 ppm) is observed, LiI is determined as c-LiI, and when a peak derived from LiI is not observed, LiI is determined as h-LiI.

7. Method for Producing Resin Composition

The method for producing the resin composition according to one aspect of the invention is not particularly limited.

A method for producing a resin composition according to one aspect of the invention includes: adding an oxidizing agent to a raw material compound containing phosphorus and sulfur as constituent elements to oxidize the raw material compound, and mixing the compound obtained by the oxidation with a thermoplastic resin.

By the method, the resin composition according to one aspect of the invention can be produced.

In one embodiment, the compound obtained by oxidation, a thermoplastic resin, and one or more components other than the compound α and the thermoplastic resin described in "3. Composite electrode layer for battery or electrolyte layer for battery" above (e.g., solid electrolyte, etc.) are mixed. As a result, a resin composition suitable for a composite electrode layer for a battery or for an electrolyte layer for a battery can be produced.

EXAMPLES

Examples of the invention will be described below, but the invention is not limited thereto.

Example 1

(1) Production of $Li_3PS_4$ Glass

In the presence of a dispersing medium (n-heptane), 1.379 g of $Li_2S$ (3N powder 200 Mesh, manufactured by Furuuchi Chemical Corporation) and 2.222 g of $P_2S_5$ (manufactured by Merck KGaA) were reacted by a mechanochemical method (mechanical milling) using a planetary ball mill (Premium Line PL-7 (manufactured by Fritsch GmbH)) under the condition described later. Then, the dispersing medium was removed by drying to obtain $Li_3PS_4$ glass (powder).

[Mechanical Milling Condition]

Sample mass: 3.6 g
Mode: Wet milling (n-heptane: 11.7 mL)
Ball: made of $ZrO_2$, 5 mm in diameter, total mass 106 g
Pot: made of $ZrO_2$, 80 mL in capacity
Rate of rotation: 500 rpm
Treatment time: 20 hours (2) Production of Compound α

$I_2$ (5N irregular grains (manufactured by Kojundo Chemical Lab. Co., Ltd.)) was ground in a mortar, and then added to $Li_3PS_4$ glass obtained in "(1) Production of $Li_3PS_4$ glass" so that the molar ratio of $Li_3PS_4$:$I_2$ was 1:1.

$Li_3PS_4$ glass and $I_2$ were then reacted in the presence of a dispersing medium (n-heptane) by a mechanochemical process (mechanical milling) using a planetary ball mill (Premium Line PL-7 (manufactured by Fritsch GmbH)) under the condition described later. Then, the dispersing medium was removed by drying to obtain a compound α (powder).

[Mechanical Milling Condition]

Sample mass: 1 g
Mode: Wet milling (n-heptane: 3 mL)
Ball: made of $ZrO_2$, 5 mm in diameter, total mass 53 g
Pot: made of $ZrO_2$, 45 mL in capacity
Rate of rotation: 500 rpm
Treatment time: 20 hours (3) Raman Spectroscopy The compound α (powder) obtained in the above "(2) Production of compound α" was treated with toluene in accordance with the below-mentioned procedure, and then subjected to microscopic Raman spectroscopy using a laser Raman spectrophotometer ("NRS-3100" manufactured by JASCO Corporation).

[Procedure for Toluene Treatment]

a. 1 g of a compound α is placed in vial, and 10 mL of toluene (manufactured by FUJIFILM Wako Pure Chemical Corporation, ultra-dehydrated) is added thereto, and the mixture is stirred and allowed to stand.
b. After removing supernatant, 10 mL of toluene is added to the solid content (precipitate) again, and the mixture is stirred and allowed to stand.
c. Step b mentioned above is repeated once more.
d. After removing supernatant, the solid content (precipitate) is dried in vacuo at 60° C. for 10 hours to obtain a toluene-treated compound α.

The Raman spectrum obtained by microscopic Raman spectroscopy is shown in FIG. 1. A peak around the Raman shift 475 $cm^{-1}$, which is derived from a disulfide (S—S) bond of P—S—S chain, was confirmed.

(4) Preparation of Coating Liquid

A coating liquid having the following composition was prepared.

[Composition of Coating Liquid]

$Li_3PS_4$ solid-state electrolyte ($Li_3PS_4$ glass obtained in "(1) Production of $Li_3PS_4$ glass"): 95 parts by mass Compound α (powder): 3.5 parts by mass Styrene-butadiene-based thermoplastic elastomer (SBS) ("TR2000" manufactured by JSR Corporation):1.5 parts by mass Anisole: 81 parts by mass based on 100 parts by mass of the total amount of the above three components (solid content)

Specifically, first, SBS was dissolved in anisole to prepare a 20% by mass SBS solution. Then, 0.028 g of the compound α (powder) was dissolved by an addition of 0.06 g of SBS solution and 0.400 mL of anisole.

Next, 0.76 g of $Li_3PS_4$ solid-state electrolyte was added to the solution and kneaded using a planetary stir defoaming device ("MAZERUSTAR KK-250S" manufactured by KURABO INDUSTRIES LTD.) under the following kneading condition.

[Kneading Condition]

Rate of rotation: 1600 rpm

Rate of revolution: 1600 rpm

Processing time: 180 seconds, 3 times

The sample was then subjected to treatment with an ultrasonic cleaner for 5 minutes and then kneaded again under the same kneading condition as described above.

Then, 0.2 mL of anisole was further added to the sample, and the mixture was further kneaded under the same kneading condition as described above to obtain a slurry-like resin composition (solid content concentration in the slurry: 55% by mass).

(5) Production of Sheet for Battery

The coating liquid obtained in "(4) Preparation of coating liquid" above was applied on a 5 cm×10 cm aluminum foil to form a coating film. Thereafter, the coating film was dried at 60° C. for 10 hours to remove the solvent (anisole), thereby producing a solid electrolyte sheet (a sheet for a battery).

(6) Ion Conductivity Measurement

The solid electrolyte sheet obtained in "(5) Production of sheet for battery" was punched out into a disk shape along with the aluminum foil, placed in a cylindrical container, and sandwiched between cylindrical SUS shafts inserted from both ends of the container, and pressed with 333 MPa pressure at room temperature (23'C). The thickness of the pressed solid electrolyte sheet is shown in Table 1.

The ion conductivity was measured by connecting a lead wire to the solid electrolyte sheet while maintaining the pressed state. For the measurement, "Cell test system 1470E" manufactured by Solartron Analytical was used. The ion conductivity calculated based on the thickness of the pressed solid electrolyte sheet is shown in Table 1.

(7) Evaluation for Adhesion Strength 1

The solid electrolyte sheet obtained in "(5) Production of sheet for battery" above was punched out into a disk shape along with the aluminum foil, wound around a cylindrical column having a diameter of 16 mm, and the presence or absence of breakage of the solid electrolyte sheet or peeling from the aluminum foil was visually observed, and the adhesion strength 1 was evaluated according to the following evaluation criteria.

[Evaluation Criteria]

A: Neither breakage of the solid electrolyte sheet nor peeling from the aluminum foil is observed in either of punching and winding on a cylinder B: In punching or winding on a cylinder, breakage of the solid electrolyte sheet or peeling from the aluminum foil is observed (8) Evaluation for Adhesive Strength 2

After the tape was attached to the surface of the solid electrolyte sheet obtained in "(5) Production of sheet for battery" above, the tape was peeled off from the solid electrolyte sheet, and the presence or absence of peeling of the solid electrolyte sheet from the aluminum foil was visually observed, and the adhesive strength 2 was evaluated according to the following evaluation criteria.

[Evaluation Criteria]

AA: Neither peeling of the solid electrolyte sheet from the aluminum foil nor in-layer peeling of the solid electrolyte sheet is observed.

A: No peeling of the solid electrolyte sheet from the aluminum foil is observed, and in-layer peeling of the solid electrolyte sheet is observed.

B: Peeling of the solid electrolyte sheet from the aluminum foil is observed

Example 2

The same procedure as in Example 1 was carried out except that the composition of the coating liquid in Example 1 was changed to the following.

[Composition of Coating Liquid]

$Li_3PS_4$ solid state electrolyte: 95 parts by mass

Compound α (powder): 2.5 parts by mass

Styrene-butadiene thermoplastic elastomer (SBS): 2.5 parts by mass

Anisole: 85 parts by mass based on 100 parts by mass of the total amount of the above three components (solid content)

Example 3

The same procedure as in Example 1 was carried out except that the composition of the coating liquid in Example 1 was changed to the following.

[Composition of Coating Liquid]

$Li_3PS_4$ solid state electrolyte: 95 parts by mass

Compound α (powder): 1.5 parts by mass

Styrene-butadiene thermoplastic elastomer (SBS): 3.5 parts by mass

Anisole: 89 parts by mass based on 100 parts by mass of the total amount of the above three components (solid content)

Comparative Example 1

The same procedure as in Example 1 was carried out except that the composition of the coating liquid in Example 1 was changed to the following.

[Composition of Coating Liquid]

$Li_3PS_4$ solid state electrolyte: 95 parts by mass

Styrene-butadiene thermoplastic elastomer (SBS): 5.0 parts by mass

Anisole: 82 parts by mass based on 100 parts by mass of the total amount of the above two components (solid content)

Comparative Example 2

The production of a sheet for a battery was attempted in the same manner as in (5) of Example 1 except that the composition of the coating liquid was changed to the following, but the peeling of the solid electrolyte sheet from the aluminum foil occurred, and the respective physical properties could not be evaluated.

[Composition of Coating Liquid]

$Li_3PS_4$ solid state electrolyte: 100 parts by mass

Anisole: 99 parts by mass based on 100 parts by mass of $Li_3PS_4$ solid electrolyte described above (solid content)

Comparative Example 3

The same procedure as in Example 1 was carried out except that the composition of the coating liquid in Example 1 was changed to the following.

[Composition of Coating Liquid]

$Li_3PS_4$ solid state electrolyte: 95 parts by mass

Compound a (powder): 5.0 parts by mass

Anisole: 87 parts by mass based on 100 parts by mass of the total amount of the above two components (solid content)

The above results are shown in Table 1.

ball mill (the same device as described above) under the condition described below to obtain an argyrodite-type solid electrolyte (powder). The refining process was carried out in two stages.

[Condition for Refining Process]

Sample mass: 1.5 g

Mode: Wet milling (toluene: 15.5 mL, isobutyronitrile: 3.9 mL)

Ball: made of $ZrO_2$, 0.5 mm in diameter, total mass of 34 g

Pot: made of $ZrO_2$, 45 mL in capacity

Milling conditions: First stage: at 370 rpm for 30 minutes

Second stage: at 150 rpm for 1 hour (B) Production of Positive Composite Electrode Layer (Positive Electrode Sheet)

(1) $LiNbO_3$ Coating on Positive Electrode Active Material 2 g of $LiNi_{1/3}Co_{1/3}Mn_{1/3}O_2$ (NMC, manufactured by MTI Corporation) was weighed and 3 mL of $LiNb(OEt)_6$ (manufactured by Alfa Aesar, lithium niobium ethoxide, 99+% (based on metals), 5% w/v in ethanol) was added thereto.

TABLE 1

| | Composition of solid electrolyte sheet | | | | | | | |
|---|---|---|---|---|---|---|---|---|
| | $Li_3PS_4$ solid electrolyte [parts by mass] | Compound α [parts by mass] | SBS [parts by mass] | mass ratio (Compound α:SBS) | Ion conductivity [$Scm^{-1}$] | Thickness after press [μm] | Adhesion strength 1 | Adhesion strength 2 |
| Example 1 | 95 | 3.5 | 1.5 | 70:30 | $3.1 \times 10^{-4}$ | 73 | A | A |
| Example 2 | 95 | 2.5 | 2.5 | 50:50 | $2.1 \times 10^{4}$ | 47 | A | A |
| Example 3 | 95 | 1.5 | 3.5 | 30:70 | $2.1 \times 10^{-4}$ | 72 | A | A |
| Comp. Ex. 1 | 95 | 0 | 5.0 | 0:100 | $1.1 \times 10^{-4}$ | 50 | A | AA |
| Comp. Ex. 2 | 100 | 0 | 0 | — | Unable to produce sample for evaluation | | | |
| Comp. Ex. 3 | 95 | 5.0 | 0 | 100:0 | $4.2 \times 10^{-4}$ | 45 | A | B |

<Evaluation>

From Table 1, it is confirmed that the use of the resin composition containing a compound α and a thermoplastic resin as a binder allows to suitably achieve both the ion conductivity and the adhesive strength.

Example 4

(A) Production of Argyrodite-Type Solid Electrolytes 0.492 g of $Li_2S$ (3N powder 200 Mesh, manufactured by Furuuchi Chemical Corporation), 0.626 g of $P_2S_5$ (manufactured by Merck KGaA), and 0.382 g of LiCl (manufactured by NACALAI TESQUE, INC.) were reacted by a mechanochemical method (mechanical milling) using a planetary ball mill (P-7, manufactured by Fritsch GmbH) under the condition described below to obtain a precursor of an argyrodite-type solid electrolyte.

[Mechanical Milling Condition]

Sample mass: 1.5 g

Mode: Dry milling

Ball: made of $ZrO_2$, 10 mm in diameter, total mass of 32 g

Pot: made of $ZrO_2$, 45 mL in capacity

Rate of rotation: 370 rpm

Treatment time: 15 hours

The above mechanical milling was carried out twice to obtain about 2.6 g of a precursor of an argyrodite-type solid electrolyte. The precursor was placed in a quartz tube and treated with heat at 430° C. for 8 hours under an argon flow atmosphere to produce an argyrodite-type solid electrolyte.

After the argyrodite-type solid electrolyte was pulverized in a mortar, a refining process was carried out by a planetary Then, 7 mL of ultra-dehydrated ethanol (manufactured by FUJIFILM Wako Pure Chemical Corporation) was added thereto. The obtained sample was subjected to ultrasonic treatment with an ultrasonic cleaner for 30 minutes and dried at 40° C. for 10 hours in an Ar atmosphere. In addition, the sample was vacuum dried at 100° C. for 1 hour. The dried sample was placed in a desiccator having a relative humidity of about 40% to 50%, and the hydrolysis reaction was allowed to proceed for 10 hours. The reacted sample was then treated with heat at 350° C. for 1 hour to obtain $LiNbO_3$-coated $LiNi_{1/3}Co_{1/3}Mn_{1/3}O_2$ ($LiNbO_3$-coated NMC). $LiNbO_3$ content in the resulting $LiNbO_3$-coated NMC was 3% by mass.

(2) Preparation of Binder Solution

First, SBS was dissolved in anisole to prepare a 20% by mass SBS solution. 0.0396 g of the compound α (powder) of Example 1 was dissolved by addition of 0.495 g of SBS solution and 0.45 mL of anisole.

(3) Production of Positive Electrode Sheet $LiNbO_3$-coated NMC, the argyrodite-type solid state electrolyte (SE) obtained in the above (A), and acetylene black (AB) (manufactured by Denka Company Limited) were mixed at a mass ratio of $LiNbO_3$-coated NMC:SE:AB=85:15:1 (total mass of 1 g).

The binder solution was added to the resulting mixture. The composition after the addition of the binder solution is $LiNbO_3$-coated NMC:SE:compound α:SBS:AB=85:15:4:1:1. This composition was kneaded to obtain a slurry (solid content concentration: 68% by mass). The resulting slurry was applied onto a 5 cm×10 cm Al foil to form a coating film. The coating film was dried at 60° C. for 10 hours and then vacuum dried at 160° C. for 3 hours. The obtained sheet was punched using a punching machine to obtain a positive electrode sheet having a diameter of 9.9 mm.

The positive electrode sheet did not break or peel off from Al foil even when wound around a cylindrical column having a diameter of 16 mm. In addition, the positive electrode sheet was successfully punched by punching machine.

Example 5

<Production of All-Solid-State Battery>

An argyrodite-type solid electrolyte (100 mg) produced in the same manner as in Example 4(A) was placed in a cylindrical container having SUS shafts on both sides and compacted to form a solid electrolyte layer. Next, the positive electrode sheet obtained in Example 4 was placed in a cylindrical container so as to stack on the solid electrolyte layer, and further, an In foil and a Li foil were placed in this order on the side opposite to the electrode sheet in the solid electrolyte layer in the cylindrical container, and press-laminated to produce an all-solid-state battery (a cell for testing). The cell was restrained by a dedicated jig, and AC impedance measurement was performed.

<AC Impedance Measurement>

The above cell restrained by a dedicated jig was charged up to 3.6 V at 0.1 C. Thereafter, AC impedance was measured using "Solartron 1470E Cell test system" manufactured by Solartron Analytical, and a Cole-Cole plot was obtained. The interfacial resistance was estimated to be 16Ω.

Example 6

A positive electrode sheet was produced in the same manner as in Example 4 except that 0.0445 g of the compound α, 0.0247 g of the SBS solution, and 0.5 mL of anisole were used. The positive electrode sheet neither break nor peel off from Al foil even when wound around a cylindrical column having a diameter of 16 mm. In addition, the positive electrode sheet was successfully punched by a punching machine.

The interfacial resistance was measured using this positive electrode sheet in the same manner as in Example 5, and was estimated to be 15 D.

Comparative Example 4

A positive electrode sheet was produced in the same manner as in Example 4 except that 0.0495 g of compound α and 0.5 mL of anisole was used without SBS. The positive electrode sheet did not break or peel off from Al foil even when wound around a cylindrical column having a diameter of 16 mm. The positive electrode sheet could be punched by a punching machine, but peeling was observed at the punched end, and the bonding property was insufficient.

The interfacial resistance was measured using this positive electrode sheet in the same manner as in Example 5, and it was 15Ω.

Comparative Example 5

A positive electrode sheet was produced in the same manner as in Example 4 except that 0.0495 g of the SBS solution and 0.4 mL of anisole were used without the compound α. The positive electrode sheet did not break or peel off from Al foil even when wound around a cylindrical column having a diameter of 16 mm. The positive electrode sheet could be punched by punching machine, but peeling was observed at the punched end, and the bonding property was insufficient.

The interfacial resistance was measured using this positive electrode sheet in the same manner as in Example 5, and it was 34Ω.

From Example 4, Example 5, Comparative Example 4, and Comparative Example 5, it was found that the use of the compound α and SBS in combination can simultaneously increase the bonding property of the composite electrode layer and reduce the cell interface resistance.

Example 7

<Production of Solid Electrolyte Sheet Using Composite Binder of Compound α and Cellulose Ether>

(1) Preparation of Coating Liquid

Cellulose ether (manufactured by Nisshin Kasei co., ltd., "Ethocen") was dissolved in anisole to produce a 20% by mass cellulose ether solution. To 0.1 g of this solution, 0.76 g of $Li_3PS_4$ solid electrolyte and 0.7 mL of anisole were added, and the mixture was stirred, and then 0.1 g of anisole solution of the compound α (concentration of 20% by mass) was added and dissolved. Next, the mixture was kneaded using a planetary stir defoaming device ("MAZERUSTAR KK-250S" manufactured by KURABO INDUSTRIES LTD.) under the following kneading condition.

[Kneading Condition]

Rate of rotation: 1600 rpm

Rate of revolution: 1600 rpm

Processing time: 180 seconds, 3 times

The kneaded sample was then subjected to ultrasonic treat using an ultrasonic cleaner for 5 minutes and then kneaded again under the same kneading condition as described above.

Then, 0.2 mL of anisole was added to the sample, and the mixture was further kneaded under the same kneading condition as described above to obtain a slurry-like resin composition (slurry solid content concentration: 48% by mass).

(2) Production of Solid Electrolyte Sheet

The coating liquid obtained in above (1) was applied on a 5 cm×10 cm aluminum foil to form a coating film. Thereafter, the coating film was dried at 60° C. for 10 hours to remove a solvent (anisole), thereby producing a solid electrolyte sheet.

The resulting positive electrode sheet neither break nor peel off from Al foil even when wound around a cylindrical column having a diameter of 16 mm. From the above result, it was found that even when cellulose ether was used in place of SBS, cellulose ether functioned well as a binder.

Example 8

<Production of Solid Electrolyte Sheet Using Composite Binder of Compound α and Polyethylene Oxide>

Polyethylene oxide (PEO) ("Poly(ethylene oxide) average My 600,000" manufactured by Sigma-Aldrich Co. LLC) was dissolved in anisole to prepare a 5% by mass polyethylene oxide solution. To 0.24 g of this solution, 0.76 g of $Li_3PS_4$ solid electrolyte and 0.8 mL of anisole were added, and after the mixture was stirred, 0.14 g of anisole solution of the compound α (concentration: 20% by mass) was added and dissolved. A slurry-like resin composition was prepared in the same manner as in Example 7 except that no additional anisole was added ("mass ratio" of the compound α:PEO=70:30).

The obtained resin composition was also capable of producing a solid electrolyte sheet in the same manner as in Example 7.

Example 9

<Production of Solid Electrolyte Sheet Using Composite Binder of Compound α and Polyethylene Oxide>

PEO was dissolved in anisole to produce a 5% by mass polyethylene oxide solution. To 0.04 g of this solution, 0.76 g of $Li_3PS_4$ solid electrolyte and 0.6 mL of anisole were added, and after the mixture was stirred, 0.19 g of anisole solution of the compound α (concentration: 20% by mass) was added and dissolved. A slurry was prepared in the same manner as in Example 7 except that no additional anisole was added ("mass ratio" of the compound α:PEO=95:5).

The obtained resin composition was also capable of producing a solid electrolyte sheet in the same manner as in Example 7.

From Examples 8 and 9, it was found that a composite binder using PEO in place of SBS also functions as a binder.

Although only some exemplary embodiments and/or examples of this invention have been described in detail above, those skilled in the art will readily appreciate that many modifications are possible in the exemplary embodiments and/or examples without materially departing from the novel teachings and advantages of this invention. Accordingly, all such modifications are intended to be included within the scope of this invention.

The documents described in the specification and the specification of Japanese application(s) on the basis of which the present application claims Paris convention priority are incorporated herein by reference in its entirety.

The invention claimed is:

1. A resin composition, comprising:

a compound comprising a $PS_4$ structure and a disulfide bond bonding two phosphorus elements; and a thermoplastic resin, wherein the resin composition comprises a halogen element X and an element M comprising lithium, sodium, magnesium, and/or aluminum, and a molar ratio M:X of the halogen element X and the element M is in a range of from 9:2 to 3:6.

2. The resin composition of claim 1, wherein the compound is obtained by oxidizing, with an oxidizing agent, a raw material compound comprising phosphorus and sulfur as constituent elements.

3. The resin composition of claim 1, wherein the compound comprises a disulfide bond formed by any of reaction schemes (1) to (3):

(1)

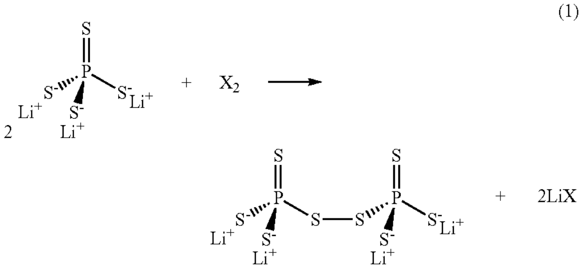

(2)

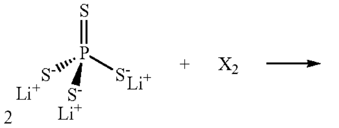

-continued

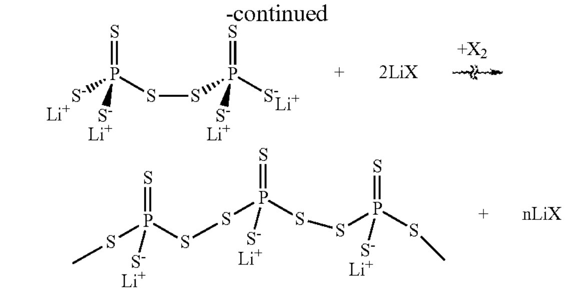

(3)

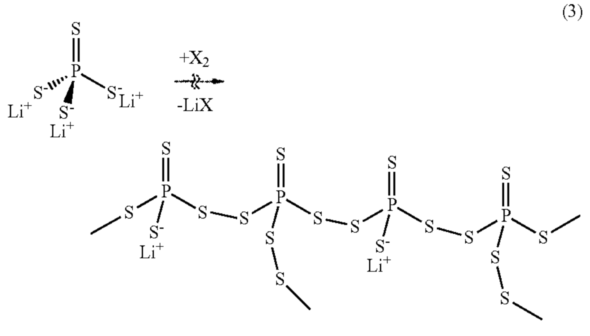

wherein

X is halogen, and n is an integer.

4. The resin composition of claim 3, wherein X in the reaction schemes (1) to (3) is iodine, fluorine, chlorine, or bromine.

5. The resin composition of claim 1, wherein the compound has a peak observed by Raman spectroscopy derived from a disulfide bond which bonds two phosphorus elements.

6. The resin composition of claim 1, wherein the thermoplastic resin comprises a styrene-butadiene-based thermoplastic elastomer, a cellulose ether, a carboxymethylcellulose, a fluorine-based resin, a polyether, a polyacrylonitrile, a polyvinylacetate, a polymethyl methacrylate, a polyphosphazene, a polyvinylpyrrolidone, a polyethylene oxide, a polyacrylic acid, and/or a polyamideimide resin.

7. The resin composition of claim 1, wherein the compound comprises lithium, sodium, magnesium, and/or aluminum as a constituent element.

8. The resin composition of claim 1, further comprising: a halogen.

9. The resin composition of claim 8, wherein the halogen is iodine or bromine.

10. A binder, comprising:

the resin composition of claim 1.

11. A composite electrode layer or an electrolyte layer, comprising:

the binder of claim 10.

12. The composite electrode layer or the electrolyte layer of claim 11, further comprising:

a solid electrolyte other than the binder.

13. A sheet, comprising:

the composite electrode layer or the electrolyte layer of claim 11.

14. A battery, comprising:

the resin composition of claim 1.

15. The resin composition of claim 1, wherein the halogen element X comprises the iodine, and wherein the element M comprises the lithium.

16. The resin composition of claim 1, comprising a crystalline phase of LiI.

17. The resin composition of claim 1, wherein the thermoplastic resin comprises a styrene-butadiene-based thermoplastic elastomer and/or a cellulose ether.

18. A resin composition, comprising:

a compound comprising a $PS_4$ structure and a disulfide bond bonding two phosphorus elements;

a thermoplastic resin; and a crystalline phase of LiI.

19. A battery, comprising:

the resin composition of claim 18.

20. A method for producing a resin composition, the method comprising:

reacting a raw material compound comprising (i) lithium as a constituent element and a $PS_4$ structure, with (ii) elemental halogen to obtain a first compound;

mixing the first compound obtained by the reacting with a thermoplastic resin, wherein a (i):(ii) molar ratio of the raw material compound (i) to the elemental halogen (ii) to be reacted is in a range of from 3:1 to 1:3.

* * * * *